March 15, 1966 J. H. M. SCHOLTEN 3,240,922

SERIAL DIGITAL ELECTRONIC COMPUTER

Filed March 3, 1961 4 Sheets-Sheet 1

INVENTOR
JOHANNES H.M. SCHOLTEN.
BY
AGENT

March 15, 1966 J. H. M. SCHOLTEN 3,240,922

SERIAL DIGITAL ELECTRONIC COMPUTER

Filed March 3, 1961 4 Sheets-Sheet 2

INVENTOR
JOHANNES H.M. SCHOLTEN.
BY
Frank R. Jerifari
AGENT

| | | |
|---|---|---|
| 0 → | 3 = | 0011 |
| 1 → | 4 = | 0100 |
| 2 → | 5 = | 0101 |
| 3 → | 6 = | 0110 |
| 4 → | 7 = | 0111 |
| 5 → | 8 = | 1000 |
| 6 → | 9 = | 1001 |
| 7 → | 10 = | 1010 |
| 8 → | 11 = | 1011 |
| 9 → | 12 = | 1100 |
| 10 → | 13 = | 1101 |
| 11 → | 14 = | 1110 |
| 12 → | 15 = | 1111 |

$$2+7 \rightarrow 5+10=15=(9+3)+3 \qquad (01)$$

$$(6+9)-10 \rightarrow 9+12=21=(5+3)+13 \qquad (02)$$

$$-3 \equiv 2^4-3=+13=1101 \qquad (03)$$

$$-13 \equiv 2^4-13=+3=0011 \qquad (04)$$

INVENTOR
JOHANNES H.M. SCHOLTEN.
BY
Frank R. Jifani
AGENT

March 15, 1966 J. H. M. SCHOLTEN 3,240,922

SERIAL DIGITAL ELECTRONIC COMPUTER

Filed March 3, 1961 4 Sheets-Sheet 4

INVENTOR
JOHANNES H.M. SCHOLTEN.
BY
Frank R. Trifari
AGENT 3,240,922

SERIAL DIGITAL ELECTRONIC COMPUTER

Johannes Hermanus Maria Scholten, Emmasingel, Eindhoven, Netherlands, assignor to North American Philips Company, Inc., New York, N.Y., a corporation of Delaware Filed Mar. 3, 1961, Ser. No. 93,172
Claims priority, application Netherlands, Mar. 12, 1960, 249,357
2 Claims. (Cl. 235—176)

The invention relates to a serial digital electronic computer containing a memory unit which is controlled by a number selector and a digit selector and is capable of storing at least two numbers, an output of this memory unit being connected to an input of a first switching memory capable of storing one digit so that each digit of a number stored in the memory can be transferred to said first switching memory; the computer also contains an adder having three inputs and two outputs, the first of these inputs being connected to an output of the first switching memory while the second input is connected to an output of a second switching memory and the third input is connected to an output of a carry memory. The first output of the adder delivers the sum digit of the digits supplied to the three inputs and the second output memory delivers the carry resulting from this addition; this carry output is connected to an input of the carry memory. In known computers the second switching memory is a shift register which has a number of digit places equal to that of the largest numbers which the machine is adapted to handle.

It is the principal object of the invention to provide a computer in which the second switching memory is considerably simplified, thereby making the computer as a whole more economical.

According to the invention the above object is attained by providing the second switching memory can accommodate only one digit, an input of this switching memory being connected, if required through the first switching memory, to an output of the memory, the computer being controlled so that it can pass through at least the following cycle of operations:

(1) The number selector is set to the line in the memory reserved for an augend *a*.

(2) The digit in the digit position of the number *a* indicated by the digit selector is transferred to the second switching memory (if required through the first switching memory).

(3) The digit in the digit position of the number *b* indicated by the digit selector is transferred to the first switching memory.

(4) The sum digit produced in the adder is transferred to a member (for example the memory or a result indicator) of the computer.

(5) The digit selector steps to the left to select the next significant digit.

In order that the invention may readily be carried out, two embodiments thereof will now be described more fully with reference to the accompanying diagrammatic drawings, wherein like reference numerals designate like elements and in which.

Figure 1:
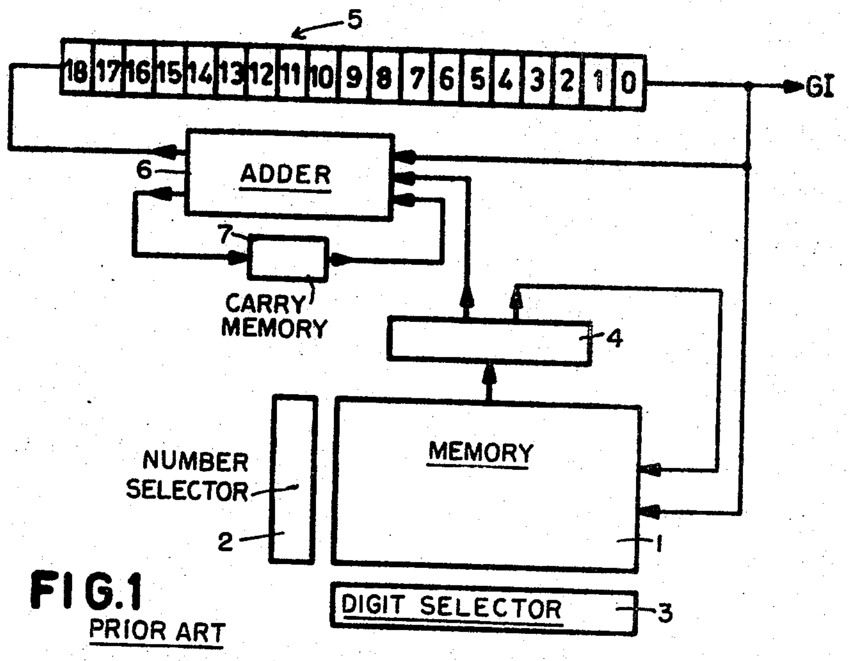
FIG.1 PRIOR ART
FIGURE 1 is a functional diagram of a known design for a serial computer.

FIGURE 1 is a functional block diagram of a known design of a serial computer. This figure shows a main memory 1, a number selector 2 and a digit selector 3. The computer further comprises a first switching memory 4, a second switching memory 5, an adder 6 and a carry memory 7. The number selector 2 can be set to each numbered stored in the memory. Similarly, the digit selector 3 can be set to each order of the numbers stored in the memory. Thus, the digit in any desired order of any number stored in the memory can be produced. The switching memory 5 is a shift register having, for example, 19 orders. It is noted that the terms "order" and "digit position" are used interchangeably in this specification. If now the sum of two numbers *a* and *b* stored in the memory is to be determined, the computer performs the following cycle of operations. The number selector 3 is set to the number *a*. The digit selector 3 then successively traverses the 19 digit positions 0, 1, 2 . . . 18. As a result the 19 digits of the number *a* are supplied in sequence to the first switching memory 4. From this switching memory 4 each of these digits is transferred to the adder 6 and also returned to the memory 1 before the reception of the next digit. Thus, the number *a* is rewritten in the main memory 1 and no information is lost. The adder 6 forms the sum digit and the carry digit resulting from the addition of the digit of the number *a* delivered by the switching memory 4, the digit originating from the second switching memory 5 and the digit delivered by the carry memory 7. Since it is assumed that the second switching memory 5 was at 0 before the addition was started, the number $a+0$ is formed, i.e., the adder forms and delivers the number *a*. This number is written in the second switching memory 5. When the first number *a* has been completely transferred to the second switching memory 5 in this manner, the number selector 2 is set to the number *b*. The digit selector again traverses all the 19 orders or digit positions 0, 1, 2 . . . 18 of the number *b*, in sequence. In the same manner as in respect to the number *a*, the digits of the number *b* are now transferred through the first switching memory 4 to the adder 6 and also rewritten in the memory 1. However, the input of the adder connected to the output of the second switching memory 5 also receives the successive digits of the number *a* so that the adder each time simultaneously receives a digit of the number *a*, a digit of the number *b* and the carry resulting from the addition at the preceding digit position and consequently forms the successive digits of the sum $a+b$. However, it can be seen that this arrangement has a limitation in that the computer must contain a second switching memory 5 having a comparatively large number of orders. As has been stated hereinbefore, it is the object of the invention to avoid this disadvantage.

Figure 2:
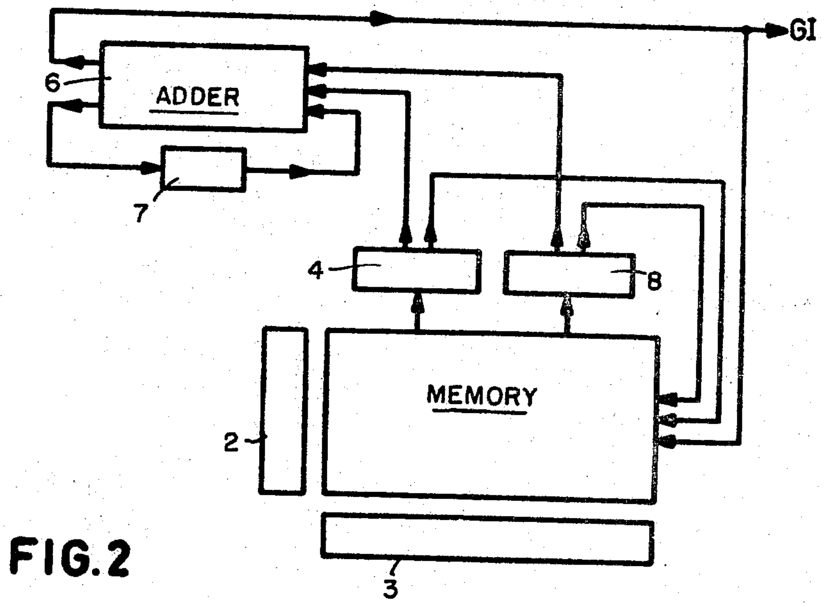
FIGURE 2 is a functional block diagram of a first embodiment of a portion of a computer in accordance with the invention.

FIGURE 2 is a functional block diagram of a first embodiment of a computer according to the invention. It can be seen from this figure that the input of the second switching memory 8 is not connected to an output of the adder 6 but to an output of the memory 1. As stated above, the second switching memory 8 in FIG. 2 also has provision for accommodating only one digit at a time. To form the sum *s* of two numbers *a* and *b* stored in the memory 1 the digit selector 3 is set to the digit place 0 after which the computer repeatedly performs the following cycle of operations.

(1) The number selector 2 is set to the line reserved in the memory 1 for the number $a$.

(2) The digit of the number $a$ in the digit position indicated by the digit selector 3 is transferred to the first switching memory 4 and also rewritten in the memory 1.

(3) The number selector 2 is set to the line in the memory 1 reserved for the number $b$.

(4) The digit of the number $b$ in the digit position indicated by the digit selector 3 is transferred to the second switching memory 8 and also rewritten in the memory 1.

(5) The number selector 2 is set to the line reserved in the memory 1 for the sum $s$ of the two numbers $a$ and $b$.

(6) The sum digit formed by the adder 6 is written in the digit position indicated by the digit selector 3 of the line of the memory 1 indicated by the number selector 2 and may also be transferred to the relevant digit position of a result indicator GI.

(7) The digit selector 3 steps to the left to select the next significant digit.

It will be appreciated that the adder 6 thus successively delivers all the digits of the sum $s=a+b$. If the computer contains a result indicator GI, the transfer of the sum $s$ to the memory 1 may be omitted. Rewriting the numbers $a$ and $b$ in the memory may also be omitted.

Figure 3:
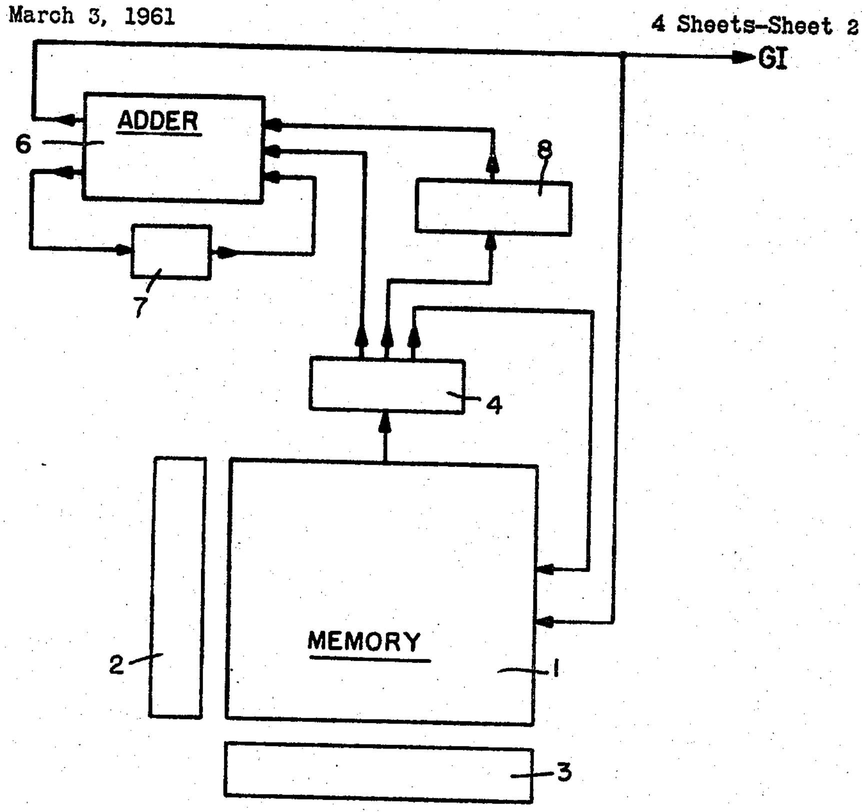
FIGURE 3 is a functional block diagram of a second embodiment of a portion of a computer according to the invention.

FIGURE 3 shows a second embodiment of a portion of a computer in accordance with the invention. The difference from the embodiment shown in FIGURE 2 consists in that the input of the second switching memory 8 is not connected to an output of the memory 1 but to an output of the first switching memory 4. Compared with the embodiment of FIGURE 2, this embodiment has the advantage that it requires slightly less hardware. To form the sum $s$ of two numbers, the digit selector 3 is again set to the digit place 0, after which the computer repeatedly performs the following cycle of operations:

(1) The number selector 2 is set to the line of the memory 1 reserved for the number $a$.

(2) The digit in the digit position of the number $a$ indicated by the digit selector 3 is transferred to the first switching memory 4.

(3) The digit of the number $a$ stored in the first switching memory 4 is transferred to the second switching memory 8 and also rewritten in the memory 1.

(4) The number selector 2 is set to the line of the memory 1 reserved for the number $b$.

(5) The digit in the digit position of the number $b$ indicated by the digit selector 3 is transferred to the first switching memory 4 and also rewritten in the memory 1.

(6) The number selector 2 is set to the line reserved in the memory 1 for the sum $s$ of the numbers $a$ and $b$.

(7) The sum digit formed by the adder 6 is written in the digit position indicated by the digit selector 3 of the line of the memory 1 indicated by the number selector 2 and may also be transferred to the relevant digit position of a result indicator GI.

(8) The digit selector CK steps to the left.

Here also, the adder 6 successively delivers the digits of the sum $s$ of the two numbers $a$ and $b$. Writting the sum $s$ in the memory 1 may be omitted if the computer has a result indicator. Rewritting the numbers $a$ and $b$ in the memory 1 may also be omitted.

Figure 4:
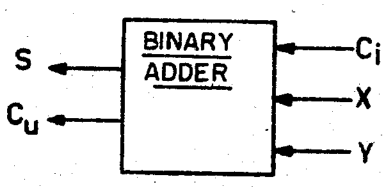
FIGURES 4 and 5 show symbols used for a binary added herein.
Figure 5:
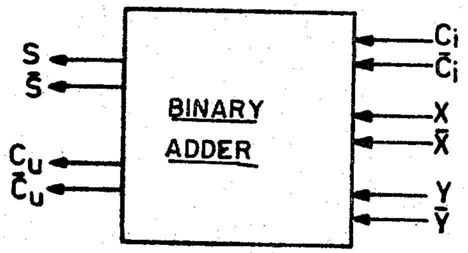

The components of the computer described can all be built in a manner and from elements known in the art. The switching memories 4 and 8 and the carry memory 7 may be flip-flops as described, for instance, at page 47 of the book by R. K. Richards, "Arithmetic Operations in Digital Computer," D. Van Nostrans, 1955. FIGURE 4 is a block-schematic diagram of a binary adder. This adder has three inputs and two outputs as shown. Digits $x$ and $y$ of corresponding digit positions of the two numbers to be added to one another and an input carry $c_1$ resulting from the addition at the preceding digit position are supplied to the inputs. The sum digit $s$ and the output carry $c_u$ to be added in the next digit position are produced at the two outputs. FIGURE 4 is based on the assumption that all variables can only be applied and delivered if they are present. However, in practice it may be of advantage to apply and/or deliver not only the variables if they are present but also the negation of each variable. In this case the functional block diagram shown in FIGURE 5 may be used for the binary adder. In the literature, numerous examples of binary adders have been described; therefore, the details thereof will not be discussed herein. See, for example, the book by R. K. Richards, noted above. For decimal computers it is particularly advantageous in practice to use the so-called "excess-3 code," which has also been extensively described, for example in the said book by Richards. This code is shown in tabular form in FIGURE 6. The formulae of this figure show that for additions in which no carry is produced a correction of $-3$ must be made, while for additions in which a carry is produced a correction of $-13$ has to be made. In binary notation (see FIGURE 6 also):

$$-3=+1101$$
$$-13=+0011$$

Figures 6, 7:
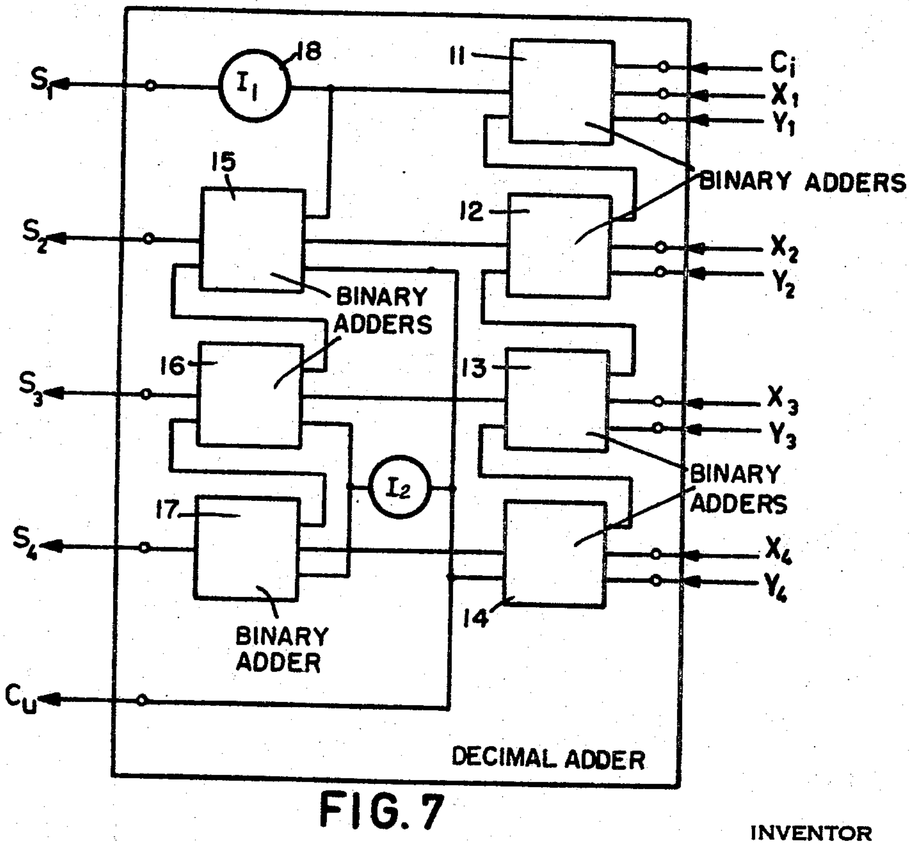
FIGURE 6 illustrates the so-called "excess-3-code."
FIGURE 7 shows the manner in which a decimal adder for the excess-3-code can be built from binary adders and inverters.

The "excess-3 code" has the further advantage that in this code the replacement of a digit by its 9-complement is equal to the replacement of each code element by its complement. FIGURE 7 shows how a decimal adder 10 can be built from seven binary adders 11–17 and two inverters 18 and 19. The binary adders 11–14 inclusive, form in known manner the digits of the binary sum of the digits supplied to them. However, when the decimal adder receives the digits $x$, $y$ and $c_2$ in the "excess-3 code," the sum formed by the said four binary adders is six too high so that, if the sum digit $s$ must also be delivered in the "excess-3 code," a correction of $-3=1101$ must be made (see Formulae 01 and 03 in FIGURE 6). If, however, the adder produces an output carry, the sum produced by the said binary adders is sixteen too high so that a correction $-13=0011$ must be made (see Formulae 02 and 04 of FIGURE 6). Since $10=2^4-6$, the output carry $c_u$ to be delivered by the decimal adder 10, which carry is always either 0 or 1, is equal to the output carry produced by the binary adder 4. The required correction of the sum delivered by the binary adders 11–14 is made by means of two inverters 18 and 19 and three binary adders 15–17. Since the correction of the first code element $s_1$ of the sum digit $s$ is always equal to 1 (see Formulae 03 and 04 of FIGURE 6), this correction can be made by an inverter 18. The correction of the second code element $s_2$ of the sum digit 3 is equal to 0, if the output carry $c_u$ is equal to 0, and equal to 1, if the output carry $c_u$ is equal to 1, i.e., this correction is equal to the output carry $c_u$. Hence, the second code element $s_2$ can be delivered by a binary adder 15 to which are supplied as input information the sum digits formed by the binary adders 11 and 12 and the carry formed by the binary adder 14, which carry is also the output carry of the decimal adder as a whole. The corrections of the third and the fourth code elements $s_3$ and $s_4$, respectively, of the sum digit $s$ are equal to the binary complements of the output carry $c_u$ (see Formulae 03 and 04 of FIGURE 6). Thus, these corrections can be made by means of two binary adders 16 and 17 to which are supplied as input information the carry produced by the preceding binary adders 15 and 16, respectively, the sum digit formed by the binary adders 13 and 14, respectively, and the binary complement of the output carry $c_u$ formed by the binary adder 14, which complement is formed from this output carry by the inverter 19. The binary adder 17 may be designed in a slightly simpler manner than the remaining binary adders since it need not form a carry.

Figure 8:
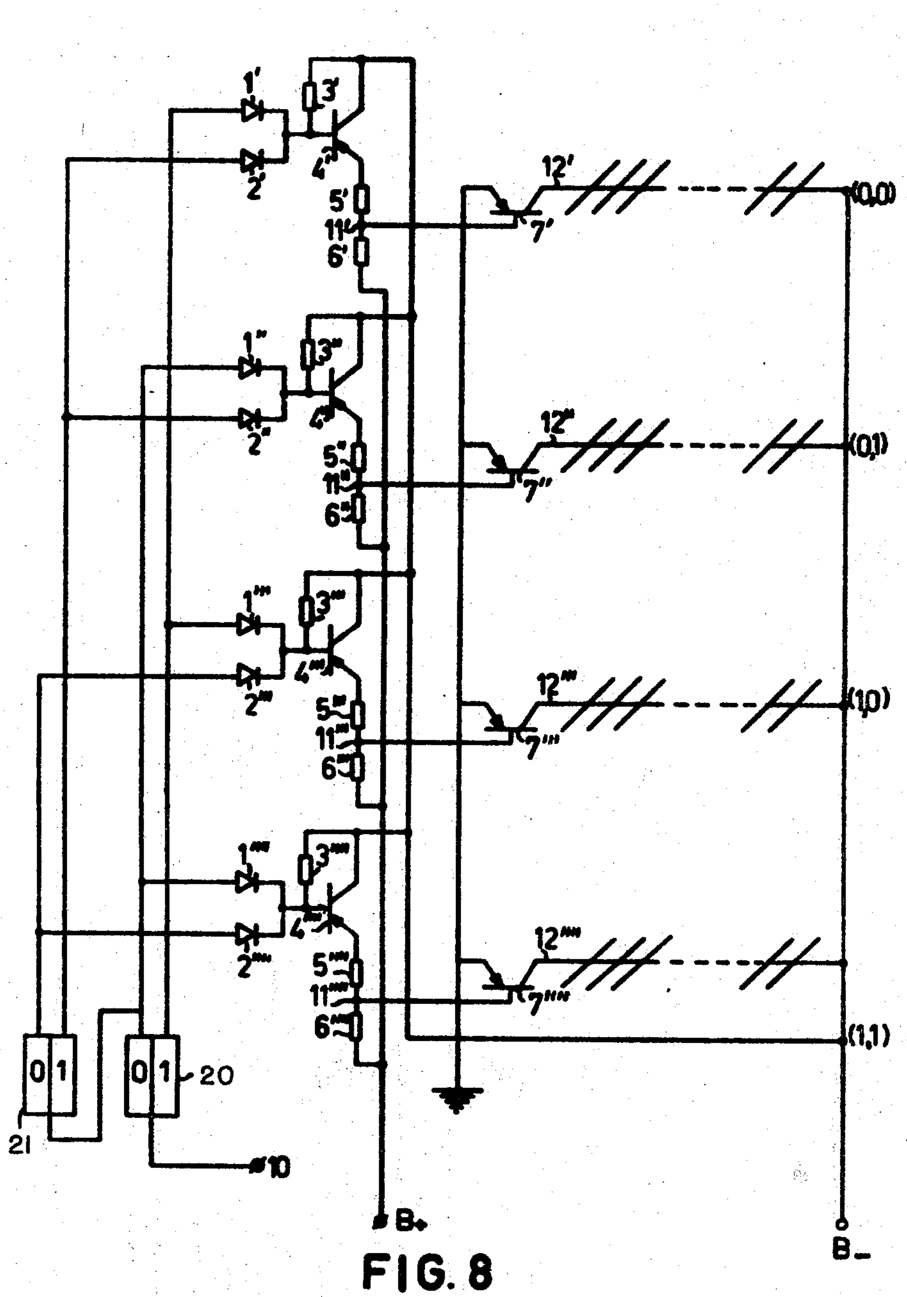
FIGURE 8 shows an example of one possible embodiment of a number selector.

FIGURE 8 shows a possible embodiment of the number selector 2 for a memory having four lines for storing four numbers. This number selector substantially comprises four electronic switches which are controlled by a counter comprising two flip-flops 20 and 21. Each electronic switch contains two pnp-transistors 4 and 7 and two resistors 5 and 6; these components are distinguished from one another for the various switches by one, two, three or four primes, respectively. The base of each transistor 4 is connected to outputs of the two flip-flops 8 and 9 of the counter through an "and" gate comprising two diodes 1 and 2 and a resistor 3. The elements 1, 2 and 3 are also distingushed from one another for the various electronic switches by means of one, two, three or four primes. If, for example, the number selector is to be set to the third number, the counter 8, 9 is first set to 0, after which two pulses are applied to an input terminal 10 of the counter. As a result the counter assumes the position (1, 0) so that a low voltage is applied to both inputs of the "and" gate 1''', 2''', 3''' only of the third electronic switch. Consequently, the two diodes 1''', 2''' are non-conductive and a low voltage is applied to the base of the transistor 4''' so that it becomes conductive. This again results in a low voltage being set up at the junction point 11''' of the two resistors 5''' and 6''', which voltage is transmitted to the base of the pnp-transistor 7''' so that this transistor also becomes conductive and a current flows through a wire 12''' relating to the third line of the memory.

Obviously, the invention is independent of the scale of notation used in the computer and of the code used for representing the digits. If a digit is represented by two or more code elements (for example four in the "excess-3 code") each input of a switching memory or adder intended for one digit corresponds to a group of two or more input terminals. Similar considerations apply to the outputs.

While particular embodiments of the present invention have been shown and described, it will be obvious to those skilled in the art that various changes and modifications may be made without departing from the inventive concept of the invention, the scope of which is set forth in the following claims.

What is claimed is:

1. A serial digital adder comprising: a memory capable of storing at least two numbers each containing a plurality of orders, selecting means for selecting the digit of a particular order of one of said numbers, means for transferring said digit to a first switching memory having a capacity of only one digit, means for subsequently transferring said digit from said first switching memory to a second switching memory having a capacity of only one digit, said selecting means also selecting the digit of the corresponding particular order of another of said numbers, said digit of the corresponding particular order being transferred to said first switching memory, an adder connected to the outputs of said first and second switching memories, said adder producing the sum of the digits of the particular order supplied thereto.

2. A serial digital adder comprising: a memory capable of storing at least two numbers each containing a plurality of orders, selecting means for selecting the digit of a particular order of one of said numbers, means for transferring said digit to a first switching memory having a capacity of only one digit, means for subsequently transferring said digit from said first switching memory to a second switching memory having a capacity of only one digit, said selecting means also selecting the digit of the corresponding particular order of another of said numbers, said digit of the corresponding particular order being transferred to said first switching memory, said selecting means also sequentially selecting the digits of the succeeding higher orders of said one and another numbers, the higher-order digits of the one number being transferred to said first switching memory and subsequently to said second switching memory, the higher-order digits of the other number being transferred to said first switching memory, and an adder connected to the outputs of said first and second switching memories, said adder thereby serially producing the sum of said numbers.

References Cited by the Examiner

UNITED STATES PATENTS

| | | | |
|---|---|---|---|
| 2,995,303 | 8/1961 | Collins | 235—176 |
| 3,023,964 | 3/1962 | Bensky et al. | 235—176 |

ROBERT C. BAILEY, *Primary Examiner.*

CORNELIUS D. ANGEL, MALCOLM A. MORRISON, *Examiners.*

M. POKOTILOW, E. M. RONEY, M. A. LERNER, *Assistant Examiners.*